US007338422B2

(12) United States Patent
Diehr et al.

(10) Patent No.: US 7,338,422 B2
(45) Date of Patent: Mar. 4, 2008

(54) FOLDING AND THREADING STATION OF A FOLDING BOX GLUING MACHINE AND METHOD OF MOVING THE THREADING STATION

(75) Inventors: Wolfgang Diehr, Grevenbroich (DE); Klaus Torka, Mönchengladbach (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 11/122,810

(22) Filed: May 4, 2005

(65) Prior Publication Data

US 2005/0250638 A1 Nov. 10, 2005

(30) Foreign Application Priority Data

May 4, 2004 (DE) ..................... 10 2004 022 214

(51) Int. Cl.
*B31B 1/00* (2006.01)
*B65G 21/10* (2006.01)

(52) U.S. Cl. ........................ 493/69; 493/141; 198/586; 198/626.1

(58) Field of Classification Search ................ 493/162, 493/177–180, 182, 130, 134, 141, 67–72, 493/142, 144; 198/626.1, 861.1, 586
See application file for complete search history.

(56) References Cited

U.S. PATENT DOCUMENTS

| | | | | |
|---|---|---|---|---|
| 1,096,633 | A * | 5/1914 | Labombarde | 493/179 |
| 1,346,899 | A * | 7/1920 | La Bombard | 493/179 |
| 1,536,800 | A * | 5/1925 | La Bombard et al. | 493/179 |
| 1,894,131 | A * | 1/1933 | Staude | 493/132 |
| 2,349,204 | A * | 5/1944 | Staude | 493/130 |
| 3,045,586 | A * | 7/1962 | Blood | 100/154 |
| 3,054,514 | A * | 9/1962 | Riley | 414/746.2 |
| 3,292,504 | A * | 12/1966 | Gres | 493/30 |
| 3,543,469 | A * | 12/1970 | Ullman | 53/456 |
| 3,605,585 | A * | 9/1971 | Borders | 493/282 |
| 4,102,252 | A * | 7/1978 | Reichert | 493/132 |
| 4,519,181 | A * | 5/1985 | Sherman et al. | 53/377.4 |

(Continued)

FOREIGN PATENT DOCUMENTS

| | | |
|---|---|---|
| DE | 1 923 734 | 12/1970 |

(Continued)

*Primary Examiner*—Rinaldi I. Rada
*Assistant Examiner*—Paul Durand
(74) *Attorney, Agent, or Firm*—Laurence A. Greenberg; Werner H. Stemer; Ralph E. Locher

(57) ABSTRACT

A folding box gluing machine contains one upper and lower transport belt disposed on each side of the machine. A lower transport belt is guided in a roller cheek and an upper transport belt is guided in a roller rail. A central roller cheek and a central roller rail, which can be fed in, are further disposed in the center of the machine and in each case guide a central transport belt. A device for inserting side parts of a folding box blank, which side parts overlap and/or engage in one another, is provided. The device is fastened to the central roller rail and is driven by the central upper transport belt through a V-shaped belt. The device for inserting is held on a holding frame in a load bearing frame which can be fed in separately. The central roller rail is additionally fastened to the holding frame.

13 Claims, 4 Drawing Sheets

U.S. PATENT DOCUMENTS

| | | | | | |
|---|---|---|---|---|---|
| 4,551,708 | A | * | 11/1985 | Welburn | 341/116 |
| 4,585,432 | A | * | 4/1986 | Marysse | 493/59 |
| 4,915,110 | A | | 4/1990 | Kitov | |
| 4,988,330 | A | * | 1/1991 | Bensberg | 493/16 |
| 5,151,075 | A | | 9/1992 | Beaulleu et al. | |
| 5,997,459 | A | * | 12/1999 | Kruger et al. | 493/441 |
| 6,315,110 | B1 | | 11/2001 | Reymond et al. | |
| 6,419,079 | B1 | | 7/2002 | Diehr | |
| 6,827,678 | B1 | | 12/2004 | Kümpel | |
| 6,971,979 | B1 | * | 12/2005 | Saro | 493/16 |

FOREIGN PATENT DOCUMENTS

| | | | |
|---|---|---|---|
| DE | 198 03 820 | A1 | 8/1999 |
| JP | 06000898 | A | 1/1994 |
| JP | 2003-154583 | | 5/2003 |
| WO | 92/07712 | | 5/1992 |
| WO | 00/02721 | | 1/2000 |
| WO | 01/21349 | A1 | 3/2001 |

* cited by examiner

FOLDING AND THREADING STATION OF A FOLDING BOX GLUING MACHINE AND METHOD OF MOVING THE THREADING STATION

BACKGROUND OF THE INVENTION

Field of the Invention

The invention relates to a threading station of a folding box gluing machine. The threading station contains in each case one upper and lower transport belt disposed on each side of the machine. The lower transport belt is guided in a roller cheek and the upper transport belt is guided in a roller rail. The upper and lower roller cheek and roller rail, which can be fed in, are disposed in the center of the machine and in each case guide a transport belt. A device for inserting side parts of a folding box blank is provided, which side parts overlap and/or engage in one another. The device is fastened to the upper central roller rail and it being possible to drive the device by the central transport belt via a V-shaped belt. Moreover, the invention relates to a method for feeding and removing a roller cheek and a roller rail, which form a central transport device of the folding box gluing machine.

As is known, folding box gluing machines of the generic type for manufacturing folding boxes from folding box blanks contain at least the now described modules as processing stations. A feeder which pulls the blanks to be processed at high speed from a stack sequentially and feeds them individually to the subsequent first processing station, an applicator unit for adhesive, usually glue, which applicator unit applies an adhesive strip to the folding lips which are to be adhesively bonded, and a folding station, in which the blank parts which have been provided with an adhesive strip are doubled over by 180°, that is to say folded, in order to produce an adhesive bond.

The folding station is usually followed by what is known as a transfer station, in which the boxes can be counted, labeled and (if defective) ejected. This is followed by a pressing station, at the start of which an overlapping stream of folded blanks is formed, which is held under pressure in the pressing station for a time, in order that the two blanks are bonded at the adhesive seam. In the brochure “DIANA. 105-2, Die kompakte Lösung: Universelle Hochleistungs-Faltschachtel-Klebemaschine” [The Compact Solution: Universal High Performance Folding Box Gluing Machine] from Jagenberg AG, a folding box gluing machine of the generic type is described. Depending on the width of a folding box blank which is transported through the folding box gluing machine, it can be necessary for the blank also to be transported in the center. In this case, it is possible to introduce a central transport device into the folding station or to feed in the transport plane of the folding box blanks. According to the prior art, this is brought about by the fact that the upper transport belt, which is guided in what is known as a roller rail is fed into the transport plane from above via guides. The lower central transport belt which is guided in what is known as a roller cheek has to be installed separately into the folding box gluing machine or can also be positioned into the transport plane by being folded up. In the case in which the blanks which are to be folded are very narrow and the two outer transport belts of the folding box gluing machine have to be guided very closely together, the lower central transport belt has to be removed from the machine. For this purpose, inter alia, the drive axle for the drive belt has to be pulled out before the central transport cheek can be removed.

In the case in which side parts of a folding box blank overlap and/or engage in one another, it can be necessary for one side part to be pulled back after folding, in order for it to be possible to press it under the other side part. In order to implement this process of pulling back and pressing in, what is known as threading in, a further transport belt with a feed roller is guided into the folding box conveying plane using the upper roller rail. The additional transport belt for threading in has a V-shape and is driven by the central transport belt of the roller rail. In order to move what is known as the threading-in station into the engagement region of the blanks, the relative position between the roller rail and the threading-in station is performed by a rebuild of the frame which carries the roller rail and the threading-in station, in such a way that the roller rail and the threading-in station are arranged in one plane, namely the transport plane of the blanks. For this purpose, an assembly part is screwed out of the frame and replaced by another assembly part, which defines the relative position.

SUMMARY OF THE INVENTION

It is accordingly an object of the invention to provide a folding and threading station of a folding box gluing machine and a method of moving the threading station that overcomes the above-mentioned disadvantages of the prior art devices and methods of this general type.

With the foregoing and other objects in view there is provided, in accordance with the invention, a folding box gluing machine. The machine contains side roller cheeks, side roller rails, and one upper and lower transport belt disposed on each side of the machine. The lower transport belts are guided in the side roller cheeks and the upper transport belts are guided in the side roller rails. The machine further contains central transport belts including an upper central transport belt and a lower central transport belt, and a central roller cheek and a central roller rail, which can be fed in, disposed in a center of the machine and in each case guide one of the central transport belts. A holding frame, a load bearing frame movably fastened to the holding frame, and a V-shaped belt, are provided. A device for inserting side parts of a folding box blank is also provided. The side parts overlap and/or engage in one another. The device is fastened to the central roller rail and driven by the upper central transport belt through the V-shaped belt. The device for inserting side parts is held on the holding frame in the load bearing frame for being fed-in separately, and the central roller rail is fastened to the holding frame.

It is one object of the invention to improve a threading device in a folding station of a folding box gluing machine in such a way that the setting up times for reconfiguring the machine between the methods with and without threading are minimized. This is to be achieved with minimum complexity and as inexpensively as possible. It is a further object according to the invention to shorten the setting up times for rebuilding a folding box gluing machine, with and without the central transport device, and to configure the lower central roller cheek independently of other machine parts during the rebuild. Moreover, it is an object of the invention to develop a method with which the central transport device can be guided in and away in a very simple manner and in a very short time using minimum time and resources.

According to the invention, the fitting times for the individual use of a threading station are reduced in that the device for inserting side parts, which overlap and/or engage in one another is accommodated in a load bearing frame which can be fed in separately. According to the invention, there is then the possibility of moving the threading station, that is to say the device for introducing side parts which overlap and/or engage in one another, into the transport plane of the folding box blanks with minimum setting up times. In contrast with the prior art, only a very small amount of refitting work is to be carried out. As a result of the arrangement of the threading station on a separate load bearing frame which is held in a linear guide, only a locking device for locking has to be released for the rebuild, in order to move the threading station into the transport plane of the blanks or to move the latter out of the transport plane. It is possible to even dispense with the removal of the transport belt of the threading station by use of a compensation roller which is used according to the invention and which maintains tension on the V-shaped transport belt during the displacement or the positioning of the load bearing frame. The refitting times are thus markedly reduced.

The second object of the invention, namely to configure the lower roller cheek of the central transport device independently of the drive device, is achieved, according to the invention, in that the transport belt of the central roller cheek is guided over a drive roller in such a way that the roller cheek can be detached from the drive roller in the direction of the roller rail. The roller cheek can then be detached from the drive roller vertically upward in the direction of the roller rail as a result of the course according to the invention of the transport belt which is pressed against the drive roller by pressure rollers and guided over the drive roller over a circumference of more then 180°, without it being necessary to remove the drive roller. The roller cheek can be detached simply from the drive with minimum fitting times by guiding the transport belt over the drive roller on the upper side of the drive roller. In a further variant of the invention and of the lower roller cheek, it is possible to extend the lower central roller cheek individually at its respective ends in the direction of the further modules of the folding box gluing machine. For this purpose, the ends of the roller cheek are configured adjustably and can be extended manually in the direction of the machine parts disposed in front of the folding station and behind the folding station and can be adapted to the latter.

From a process engineering point of view, the object set is achieved to the extent that a holder which is arranged on the roller cheek is fastened to the roller rail and a further holder is fastened to the load bearing frame, and that the roller rail with the roller cheek fastened thereto is subsequently moved out of the transport plane perpendicularly upward, the perpendicular direction relating to the transport plane of the folding box blanks. The implementation of the method according to the invention then provides the possibility of moving the central transport device of a folding station in a folding box gluing machine out of the working region of the machine in a very short time. The central transport device is moved out to such an extent that any desired work step which can be carried out for manufacturing in the folding station can be carried out in an unimpeded manner below the central transport device which has been moved out.

Other features which are considered as characteristic for the invention are set forth in the appended claims.

Although the invention is illustrated and described herein as embodied in a folding and threading station of a folding box gluing machine and a method of moving the threading station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
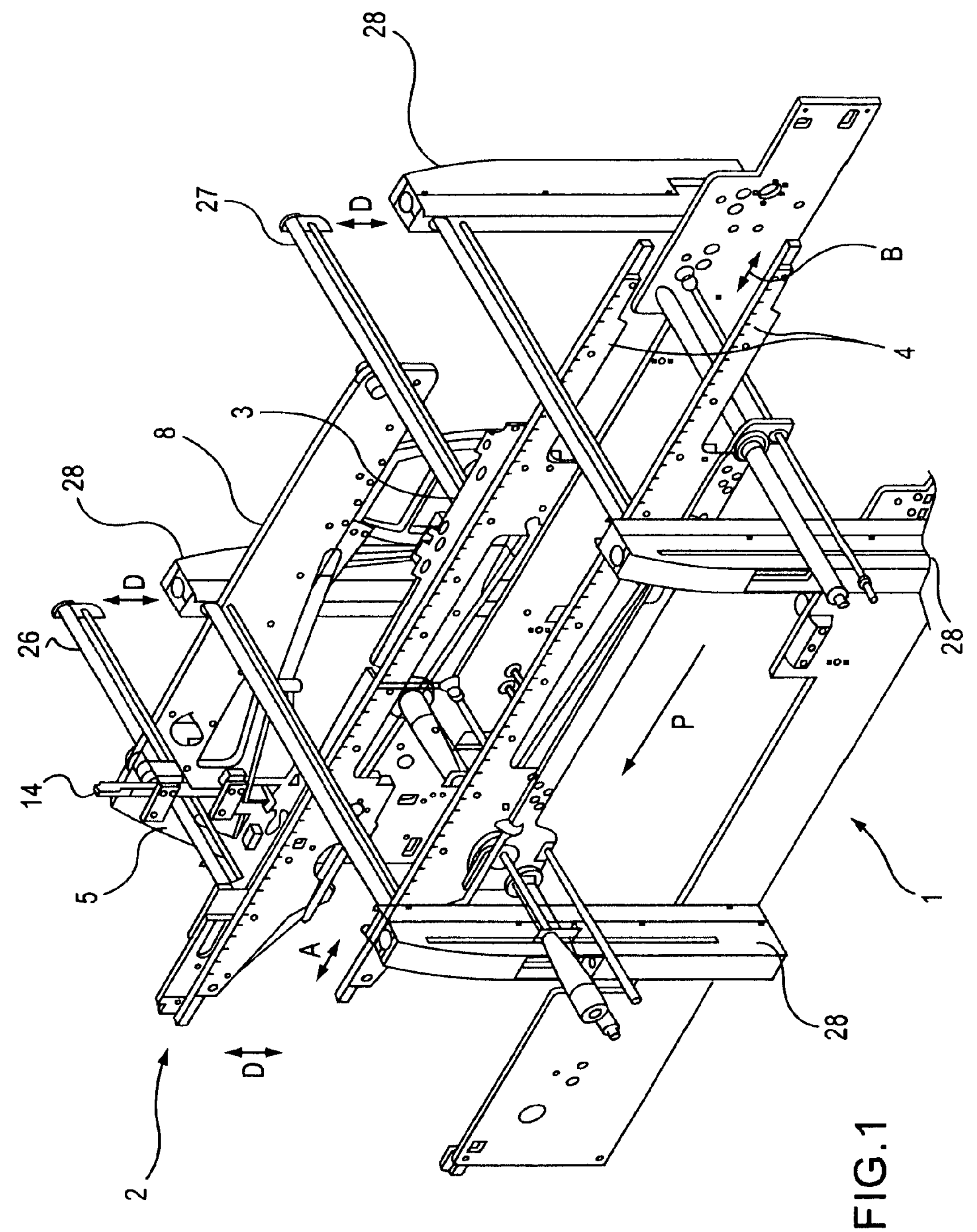
FIG. 1 is a diagrammatic, perspective view of a configuration of a central transport device and a threading station in the folding station of a folding box gluing machine.

Referring now to the figures of the drawing in detail and first, particularly, to FIG. 1 thereof, there is shown a three-dimensional illustration of a folding station 1 of a folding box gluing machine in one exemplary embodiment. The folding station 1 has a central transport device 2, which is formed from an upper roller rail 3 and side and lower roller cheeks 4, holding a set of guide rollers. A carrying arm 5 is fastened movably to an upper holding frame 8. Here, the central transport device 2 contains the roller cheek 4 and the upper roller rail 3. The conveying direction of the folding box blanks extends in a direction of arrow P through the folding station 1 of the folding box gluing machine.

Figure 2:
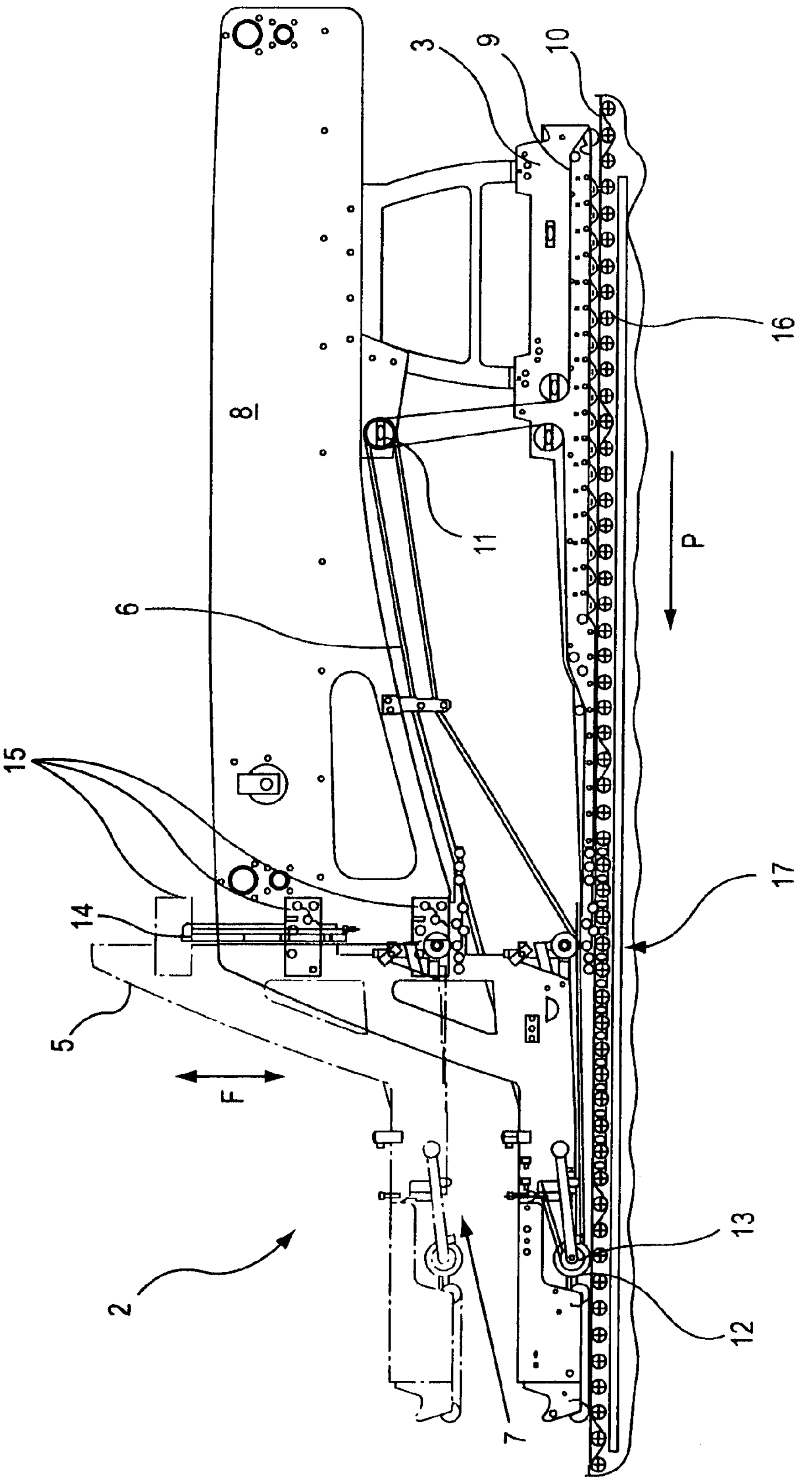
FIG. 2 is a diagrammatic, side view of an upper roller rail of the central transport device with a threading station.

FIG. 2 shows the roller rail 3 in greater detail, with a threading station 7, which is fastened to the carrying arm 5. The roller rail 3 firstly and the load bearing frame 5 secondly are fastened to a holding frame 8. A first transport belt 9 is guided over deflection and drive rollers into a transport plane 10 of the central transport device 2. The transport belt conveys centrally on one side of the folding box gluing machine blanks between lateral transport belts of the machine and drives a V-shaped transport belt 6 via an adjustable gear mechanism 11. The V-shaped transport belt 6 is guided via deflection rollers to a feed roller 12 at a rear end of the central transport device 2. Here, the speed of the V-shaped transport belt 6 can be set by the step-up gear mechanism 11. In one variant of the invention, the gear mechanism 11 can contain a drive roller which accommodates the V-belt and is provided with a V-shaped groove, with the result that, when the two halves of the V-shaped drive are pulled apart, the V-belt is in contact with different flank diameters and can be operated accordingly at different conveying speeds. The V-belt 6 is preferably driven at a speed that is slightly reduced compared with the transport belts 9, 16. The feed roller 12 is driven by the V-belt 6 at the end of the threading station 7. A roller 12 with a rubber covering is preferably used as the feed roller 12. The rubber roller 12 is driven by the V-belt 6 via a V-belt pulley 13. Here, the feed roller 12 has a greater diameter than the V-belt pulley 13, which drives the feed roller 12. The circumferential speed of the feed roller 12 is thus greater than the transport speed of the V-belt 6. Here, the diameter of the feed roller 12 is also, however, selected in such a way that the circumferential speed is always greater than the speed of the transport belts 9, 16.

If the threading station 7 is then not required for the folding box which is to be produced, the load bearing frame 5 with the threading station 7 fastened thereto can be moved out of the transport plane 10 of the folding box blanks. For this purpose, a linear guide 14 and a gas pressure spring are provided on the holding frame 8, by which the load bearing frame 5 can be moved in the direction of arrow F very easily and thus with minimum fitting times. Here, the tension in the V-belt 6 can be maintained with the aid of a non-illustrated compensation roller. Once the load bearing frame 5 has been moved out of the transport plane 10, the load bearing frame 5 can be locked on the holding frame 8 in the moved-out position with the aid of a locking device 15 which contains, for example, installation lugs 15. Therefore, for refitting, only the locking device 15 has to be released and fastened again. The refitting times are thus reduced to a minimum.

Figure 3:
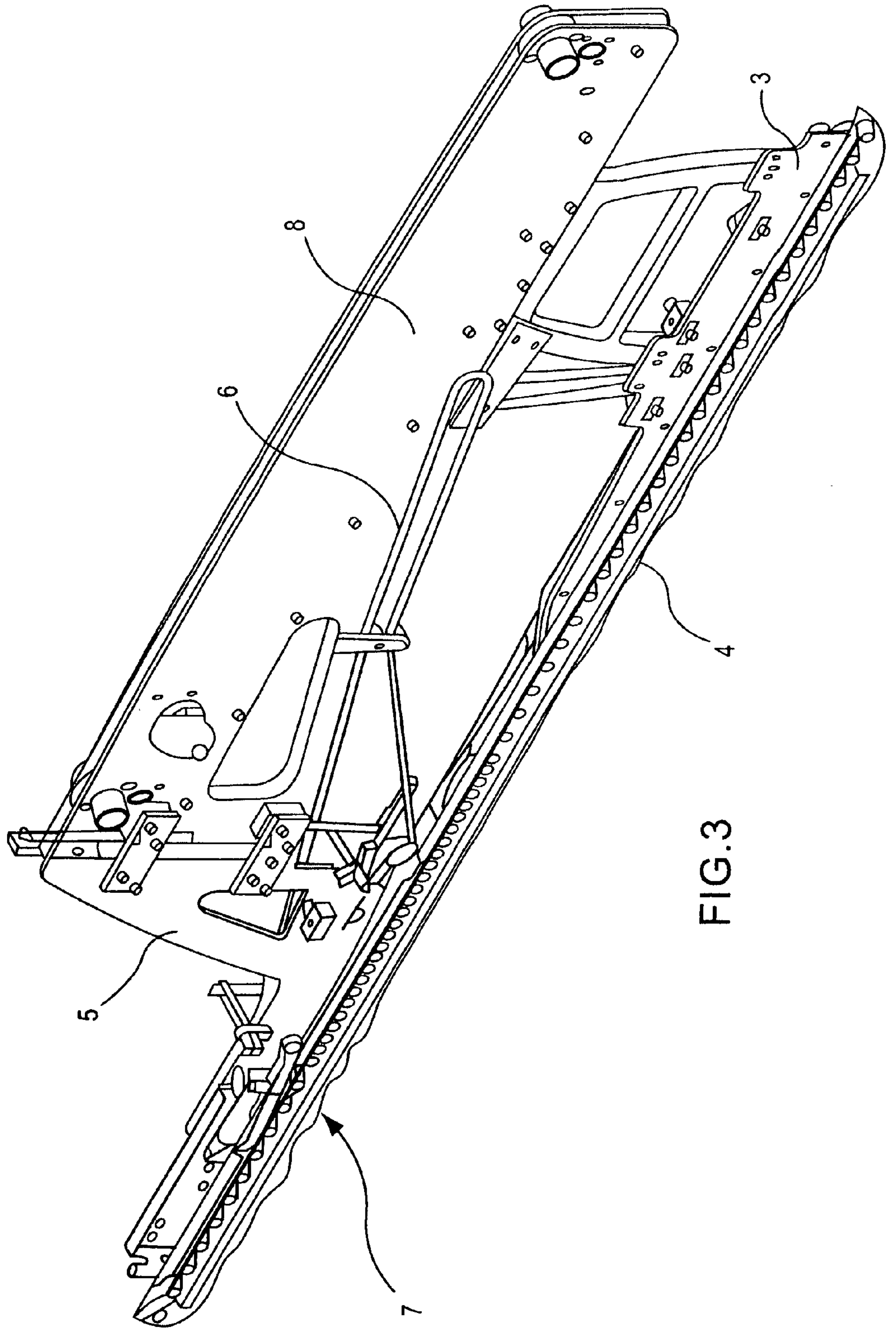
FIG. 3 is a diagrammatic, perspective view of the upper roller rail with a threading station in specific use.

FIG. 3 shows the upper roller rail 3 with the holding frame 8 and the load bearing frame 5 with the integrated threading station 7, once again in a perspective illustration. The view shown clarifies the function during the use of the threading station 7.

If a folding box blank is then conveyed over the transport plane 10 by the upper conveyor belt 9 and the lower conveyor belt 16 of the central transport device 2, the two side parts of the folded blank pass under the V-belt 6 at point 17. The side part which is in contact with the V-belt 6 is then braked by the V-belt 6 which is driven at a reduced speed compared with the belts 9, 16 of the central transport device, and can thus pass under a part of the folding box which overlaps and/or engages in itself. This part, which is held back is then accelerated again below the feed roller 12 and is thus pressed under the other side part or a base tab or a corresponding complementary piece.

Folding base boxes thus frequently have overlapping tabs in the region where the lateral tabs or lateral regions are brought together, which overlapping tabs make it necessary that the left hand region has to be pulled back initially during assembly, in order for it to be possible to push it to the front again under a tab of the right-hand region. The invention assists this folding in that the left hand lateral region or box region is held back by the V-shaped transport belt 6 whose speed has been set, until the folding has been concluded and is pulled forward subsequently via a co-rotating feed roller 12.

Figure 4:
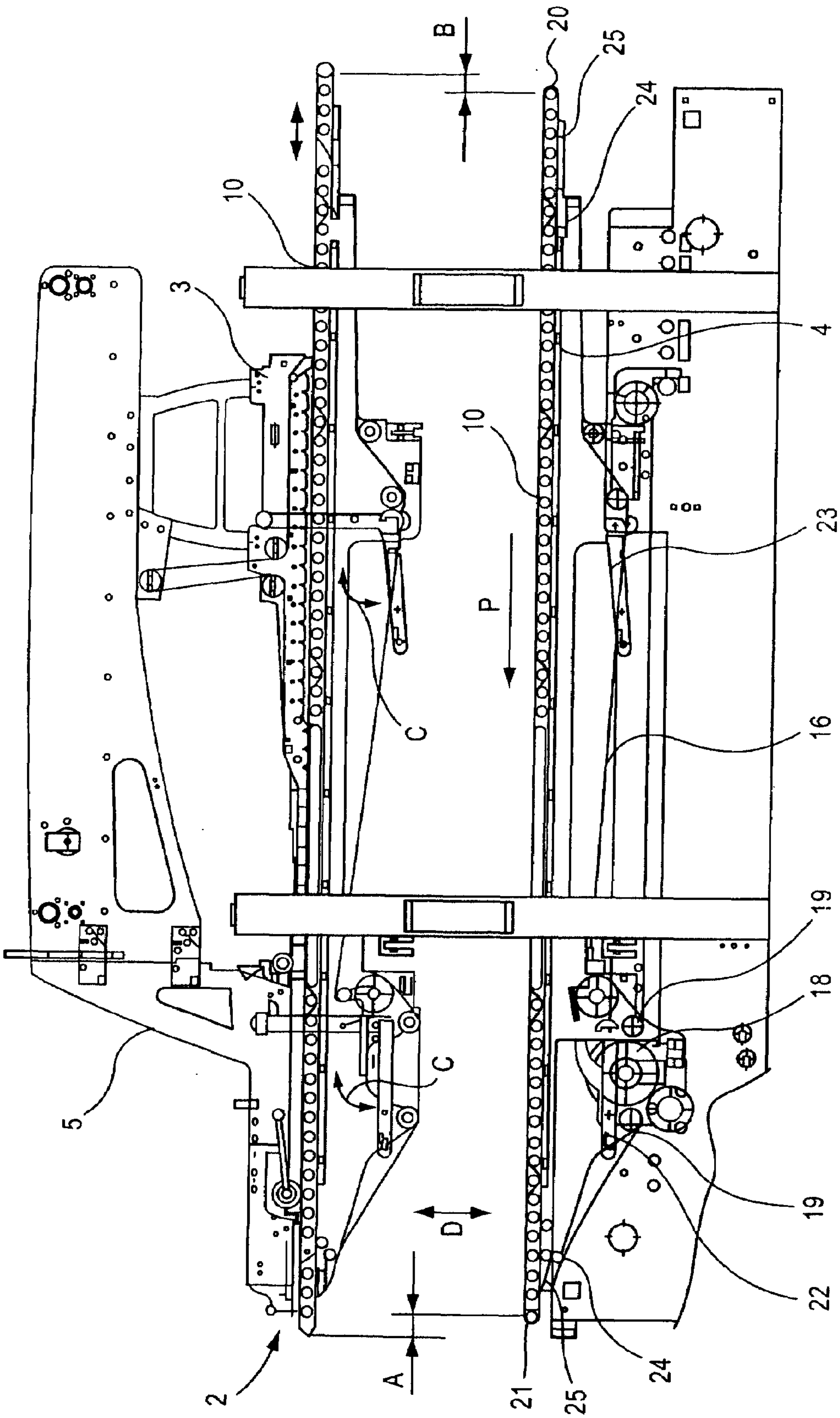
FIG. 4 diagrammatic, side view of a central transport device, containing a roller cheek and a roller rail in a folding station in the moved-in and moved-out state.

FIG. 4 shows the side view of the central transport device 2 according to the invention and, in particular, the lower roller cheek 4 with the transport belt 16 guided therein. According to the invention, the transport belt 16 is guided around a drive roller 18. For this purpose the transport belt 16 is wrapped around the drive roller 18 by deflection rollers 19, in order thus to attain as high a force-transmitting connection as possible via the drive roller 18. An advantage of this refinement is that the roller cheek 4 can then be detached from the drive roller 18 in the direction of the roller rail 3, independently of the drive roller 18.

Holders 22, 23 which have slot-shaped openings are fastened pivotably to the roller cheek 4. Pins which correspond to the holders 22, 23 are attached to the upper roller rail 3 or the load bearing frame 5, by which pins the roller cheek 4 can be connected to the roller rail 3 and the load bearing frame 5. Here, the holders 22, 23 pivot in the direction of the arrow C.

If the central transport device 2 is then not required for the folding of a folding box blank, the central transport device 2 can be moved out of the transport plane 10. For this purpose, the holders 22, 23 are pivoted in the direction of arrow C and connected to the load bearing frame 5 and the roller rail 3. As the transport belt 16 is guided only over the drive roller 18, the central transport device can be moved out of the transport plane 10 as one unit.

According to the invention, the lower central roller cheek 4 can be extended at its ends 20, 21. For this purpose, the guide rollers of the transport belt 16 which are situated at the end are accommodated displaceably in the roller cheek 4. The roller cheek can thus be extended in the direction of upstream or downstream modules of the folding box gluing machine. These changes in length are designated with B in the front region of the roller cheek and with A in the rear region of the roller cheek. The changes in length are in magnitudes between 0 mm and approximately 100 mm, preferably from 60 mm to 75 mm.

In order to make length compensation of the roller cheek 4 possible, without it being necessary to carry out relatively great rebuild work and fitting times, a storage roller system contains two deflection rollers 24 disposed opposite one another is provided at the respective end of the roller cheek 4. The length compensation thus occurs in a very short fitting time as a result of the fact that only the fixing screws 25 are released and the guide rollers for the transport belt 16 which are situated at the end of the roller cheek 4 are displaced in the direction of the adjacent modules.

FIG. 1 clarifies the manner in which the central transport device 2 is lifted out of the transport plane 10 of the folding station 1. After the roller cheek has been fastened to the load bearing frame 5 and the roller rail 3, the central transport device 2 forms a fixedly connected unit. The holding frame 8 is held in the folding station 1 by the cross-members 26, 27. Here, the cross-members 26, 27 rest on sleeves 28 fastened to the sides of the machine frame or are connected fixedly there. If the central transport device 2 is not then required, the sleeves 28 are provided with spindle drives, with which the cross-members 26, 27 and thus also the central transport device 2 can be displaced out of the transport plane 10 in the direction of the arrow D. Here, the central transport device 2 can be moved so far out of the transport plane 10 that all of the folding box blanks, which are to be produced on the assembly can be processed. Here, it is possible to realize a height, which can be moved out to of approximately 1.5 m in the direction of the arrows D. The central transport device 2 can thus be removed out of the transport plane 10, to be precise so far that the roller cheeks, disposed on the left and the right, of the lateral transport belts can be moved together completely. There is thus no format restriction after the central transport device 2 has been removed. The setting up times and refitting times for the central transport device 2 and without the central transport device 2 are thus reduced to the minimum time for the central transport device 2 to move out and for the lateral roller cheeks and roller rails of the folding box gluing machine to move together.

This application claims the priority, under 35 U.S.C. § 119, of German patent application No. 10 2004 022 214.2, filed May 4, 2004; the entire disclosure of the prior application is herewith incorporated by reference.

We claim:

1. A folding box gluing machine, comprising:

side roller cheeks;

side roller rails;

one upper and lower transport belt disposed on each side of the machine, said lower transport belts being guided in said side roller cheeks and said upper transport belts being guided in said side roller rails;

central transport belts including an upper central transport belt and a lower central transport belt;

a central roller cheek and a central roller rail, which can be fed in, disposed in a center of the machine and in each case guide one of said central transport belts;

a holding frame;

a carrying arm movably fastened to said holding frame;

a V-shaped belt; and a device for inserting side parts of a folding box blank, the side parts at least one of overlap and engage in one another, said device being fastened to said central roller rail and driven by said upper central transport belt through said V-shaped belt, said device for inserting side parts being held on said holding frame in said carrying arm for being fed-in separately, and said central roller rail fastened to said holding frame.

2. The folding box gluing machine according to claim 1, further comprising a linear guide for fastening said carrying arm to said holding frame.

3. The folding box gluing machine according to claim 1, wherein said V-shaped belt is guided such that said V-shaped belt is held under tension even during a feeding-in process.

4. The folding box gluing machine according to claim 1, further comprising a locking device for locking said carrying arm and disposed on said central roller rail.

5. The folding box gluing machine according to claim 1, further comprising:

a frame;

sleeves fastened on said frame; and cross members including a front cross-member carrying said central roller rail and a rear cross-member extending transversely over a width of the folding box gluing machine, and each of said cross-members is held at each end in one of said sleeves.

6. The folding box gluing machine according to claim 5, wherein each of said sleeves is extendable in a direction out of a transport plane.

7. A folding box gluing machine, comprising:

side roller cheeks;

side roller rails;

one upper and lower transport belt disposed on each side of the machine, said lower transport belts being guided in said side roller cheeks and said upper transport belts being guided in said side roller rails;

central transport belts including an upper central transport belt and a lower central transport belt;

a central roller check and a central roller rail, which can be fed in, and disposed in a center of the machine and in each case guide one of said central transport belts;

a drive roller;

a V-shaped belt; and a device for inserting side parts of a folding box blank, the side parts at least one of overlap and in one another, said device being fastened to said central roller rail and being driven by said upper central transport belt through said V-shaped belt;

said lower transport belt traversing in said central roller cheek being guided over said drive roller such that said central roller cheek can be detached from said drive roller in a direction of said central roller rail.

8. The folding box gluing machine according to claim 7, further comprising at least one deflection roller, said lower central transport belt of said central roller cheek is guided around said drive roller by said deflection roller.

9. The folding box gluing machine according to claim 7, further comprising a connecting device attached to said central roller cheek for connecting to said central roller rail.

10. The folding box gluing machine according to claim 9, further comprising a cylindrical pin, said connecting device is a pivotable holder having a slot-shaped opening formed therein, said slot-shaped opening interacting with said cylindrical pin which is fastened to said central roller rail.

11. The folding box gluing machine according to claim 7, wherein said central roller cheek can be extended in such a way that said lower central transport belt can be displaced outward in a direction of an adjacent module of the folding box gluing machine.

12. The folding box gluing machine according to claim 7, further comprising:

a frame;

sleeves fastened on said frame; and cross members including a front cross-member carrying said central roller rail and a rear cross-member extending transversely over a width of the folding box gluing machine, and each of said cross-members is held at each end in one of said sleeves.

13. The folding box gluing machine according to claim 12, wherein each of said sleeves is extendable in a direction out of a transport plane.

* * * * *